United States Patent
Bussear

(10) Patent No.: US 10,675,729 B2
(45) Date of Patent: Jun. 9, 2020

(54) ELECTROMECHANICAL ROTARY PIPE MILL OR HONE AND METHOD

(71) Applicant: Terry R. Bussear, Spring, TX (US)

(72) Inventor: Terry R. Bussear, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/609,744

(22) Filed: May 31, 2017

(65) Prior Publication Data

US 2018/0345445 A1     Dec. 6, 2018

(51) Int. Cl.
| | |
|---|---|
| *B24B 33/02* | (2006.01) |
| *B24B 33/08* | (2006.01) |
| *B24B 5/40* | (2006.01) |
| *B23C 3/02* | (2006.01) |
| *E21B 29/00* | (2006.01) |

(52) U.S. Cl.
CPC .............. *B24B 33/022* (2013.01); *B23C 3/02* (2013.01); *B24B 5/40* (2013.01); *B24B 33/02* (2013.01); *B24B 33/08* (2013.01); *B24B 33/082* (2013.01); *B24B 33/087* (2013.01); *E21B 29/005* (2013.01); *B23C 2220/48* (2013.01); *B23C 2270/18* (2013.01)

(58) Field of Classification Search
CPC ......... B24B 5/40; B24B 33/02; B24B 33/022; B24B 33/08; B24B 33/087; B23C 2220/48; B23C 2270/18; E21B 29/005
USPC ............................................. 451/51, 61, 180
See application file for complete search history.

(56) References Cited

U.S. PATENT DOCUMENTS

| | | | | | |
|---|---|---|---|---|---|
| 1,601,813 | A | * | 10/1926 | Emerson ................. | B24B 33/08 451/474 |
| 2,966,766 | A | * | 1/1961 | Ronaldson ................ | B24B 5/40 15/104.14 |
| 3,330,078 | A | * | 7/1967 | Von Tersch ............. | B24B 33/08 451/484 |

(Continued)

FOREIGN PATENT DOCUMENTS

| | | |
|---|---|---|
| WO | 1993016833 A1 | 9/1993 |
| WO | 2014028220 A1 | 2/2014 |

OTHER PUBLICATIONS

"Downhole Electric Cutting Tool (DECT)"; GE Oil & Gas; 2012 General Electric Company, 2 pages; www.ge-energy.com/wireline.

(Continued)

*Primary Examiner* — Eileen P Morgan
(74) *Attorney, Agent, or Firm* — Cantor Colburn LLP

(57) ABSTRACT

An electromechanical rotary pipe mill or hone including a body, a motor with a mill or hone disposed thereon in radially adjustable position with respect to the body, a clamping device extendable from the body and configured for anchoring the tool in a tubular, and a portion of the body that is rotatable about an axis of the electromechanical pipe mill or hone. A method for removing material in a tubular including running on electric wireline an electromechanical rotary pipe mill or hone as in any prior embodiment to a target location in a tubular, registering the mill or hone with a feature identified for removal of material, deploying the clamping device, rotating the mill or hone on its own axis, rotating a portion of the body about its own axis, and radially displacing the mill or hone to remove material.

8 Claims, 2 Drawing Sheets

(56) References Cited

U.S. PATENT DOCUMENTS

| | | | |
|---|---|---|---|
| 7,575,056 B2* | 8/2009 | Fuhst | E21B 29/005 166/298 |
| 7,802,949 B2* | 9/2010 | Fuhst | B23D 21/14 166/55.7 |
| 8,113,271 B2* | 2/2012 | Fuhst | E21B 29/005 166/55 |
| 8,210,251 B2* | 7/2012 | Lynde | E21B 23/14 166/55.7 |
| 8,973,651 B2* | 3/2015 | Fuhst | E21B 29/005 166/298 |
| 9,410,389 B2* | 8/2016 | Fanini | E21B 29/002 |
| 9,580,985 B2* | 2/2017 | Fuhst | E21B 29/04 |
| 2002/0150436 A1 | 10/2002 | Mason et al. | |
| 2009/0294127 A1* | 12/2009 | Krueger | E21B 29/005 166/298 |
| 2009/0308605 A1 | 12/2009 | McAfee et al. | |
| 2010/0065264 A1* | 3/2010 | Nackerud | E21B 10/322 166/55.7 |
| 2010/0252265 A1 | 10/2010 | Verma | |
| 2010/0258289 A1 | 10/2010 | Lynde et al. | |
| 2011/0000668 A1* | 1/2011 | Tunget | E21B 23/14 166/285 |
| 2011/0192589 A1* | 8/2011 | Fuhst | E21B 29/005 166/55 |
| 2012/0184182 A1* | 7/2012 | Mayer | B23Q 15/04 451/5 |
| 2012/0318579 A1* | 12/2012 | Yang | E21B 49/06 175/44 |
| 2014/0033885 A1* | 2/2014 | Fuhst | E21B 29/04 83/34 |
| 2015/0060040 A1* | 3/2015 | Ruttley | E21B 29/005 166/55.1 |
| 2017/0043444 A1* | 2/2017 | Okada | B24B 29/00 |
| 2017/0136654 A1* | 5/2017 | Fujita | B24B 33/02 |

OTHER PUBLICATIONS

Overview: "Mechanical Pipe Cutter Tool; Achieve fast and effective pipe recovery"; Baker Hughes brochure; 2011, 2 pages, www.bakerhughes.com.

Notification of Transmittal of the International Search Report and the Written Opinion of the International Searching Authority, or the Declaration; PCT/US2018/030190; dated Aug. 21, 2018; 11 pages.

* cited by examiner

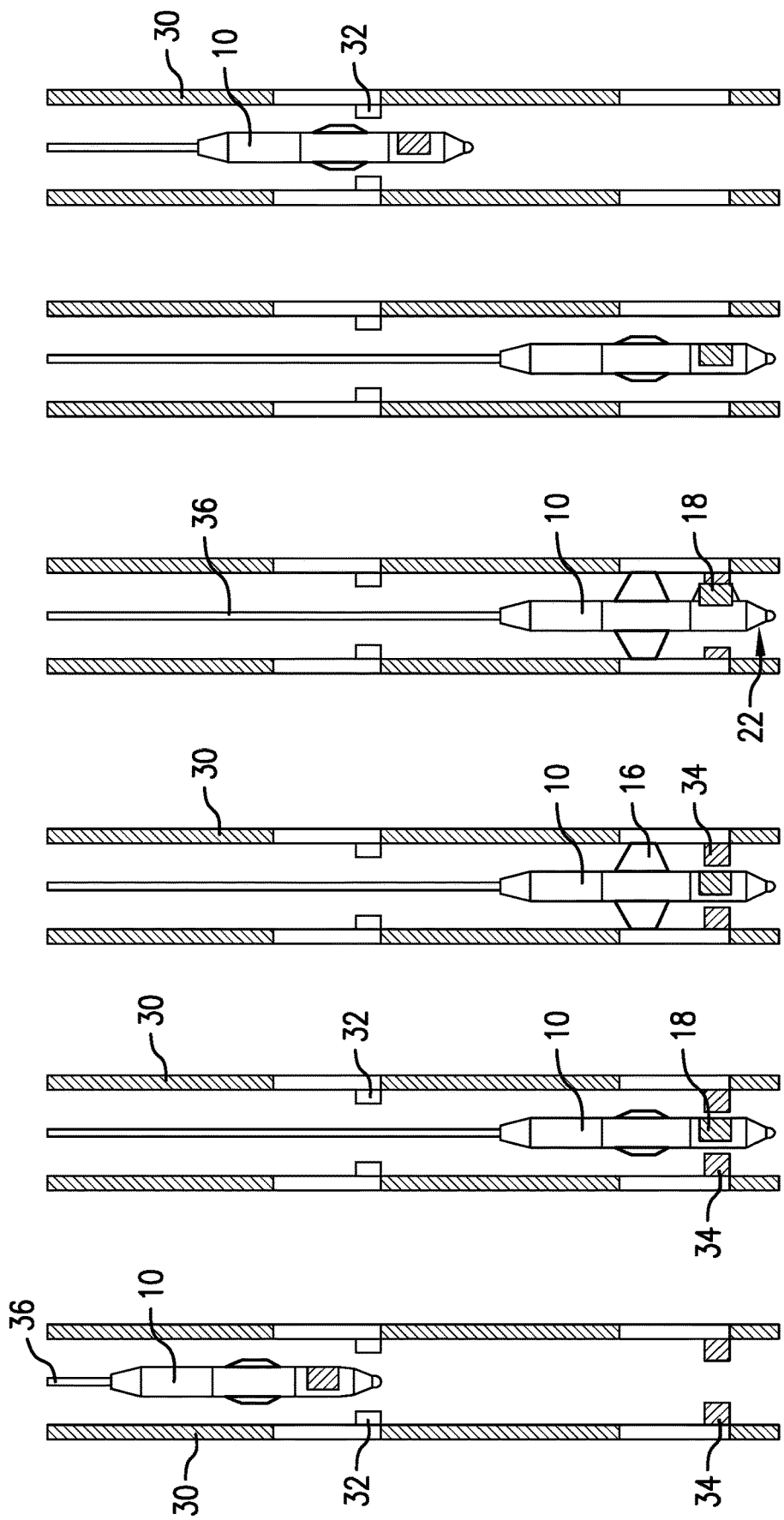

ELECTROMECHANICAL ROTARY PIPE MILL OR HONE AND METHOD

BACKGROUND

In subsurface resource recovery industries tubular strings are often run into boreholes for various operations. Sometimes strings may have multiple uses, this being desirable due to cost in tripping strings. For multiple uses however, there may be features of the string that have to be modified. For example, restrictions in a string that are originally disposed therein for specific utility may become a hindrance for a secondary use of the string in the borehole. These restrictions then have been removed in order to effect whatever secondary use of the string is contemplated. Traditionally, such restrictions are removed utilizing a broach on slickline. The method works and has been used for years but it is difficult to control the cutting action and the broach is prone to becoming stuck in the very restriction it is designed to remove. Issues such as these create problems for operators and invariably end up increasing costs. Accordingly, the art would welcome alternative concepts in material removal.

SUMMARY

An electromechanical rotary pipe mill or hone including a body, a motor with a mill or hone disposed thereon in radially adjustable position with respect to the body, a clamping device extendable from the body and configured for anchoring the tool in a tubular, and a portion of the body that is rotatable about an axis of the electromechanical pipe mill or hone.

A method for removing material in a tubular including running on electric wireline an electromechanical rotary pipe mill or hone as in any prior embodiment to a target location in a tubular, registering the mill or hone with a feature identified for removal of material, deploying the clamping device, rotating the mill or hone on its own axis, rotating a portion of the body about its own axis, and radially displacing the mill or hone to remove material.

BRIEF DESCRIPTION OF THE DRAWINGS

The following descriptions should not be considered limiting in any way. With reference to the accompanying drawings, like elements are numbered alike:

FIGS. 2-7 are schematic views of the tool of FIG. 1 in various positions and conditions within a borehole in use.

DETAILED DESCRIPTION

Figure 1:
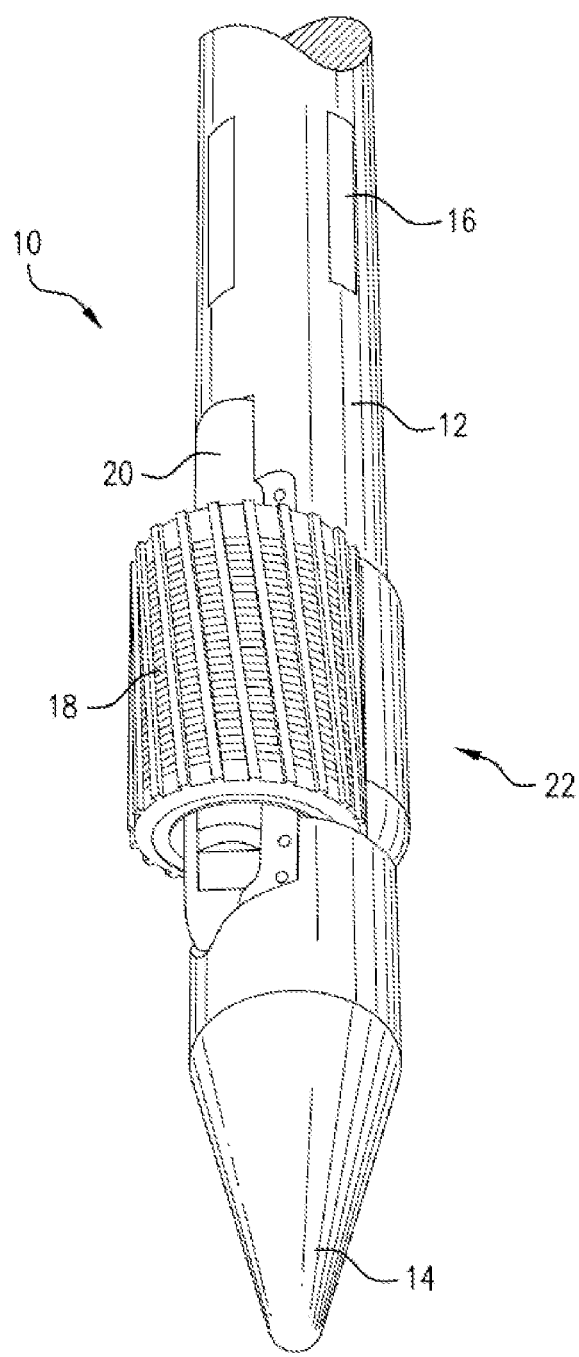
FIG. 1 is a perspective view of a material removal tool as disclosed herein.

A detailed description of one or more embodiments of the disclosed apparatus and method are presented herein by way of exemplification and not limitation with reference to the Figures.

Referring to FIG. 1, a perspective view of an electromechanical rotary pipe mill or hone 10 also termed tool 10 herein configured to be run on electric wireline to reliably and controllably remove material from an inside surface of a tubular member is illustrated. The tool 10 includes a body 12 having a nose 14. The body 12 supports a clamping device 16 remotely actuable from, for example a surface controller using a casing collar locator (not shown) or automatically actuable based upon a local input such as a sensory input that confirms location of the tool 10 at the target location. Once the location has been confirmed (sensorily or from surface), the clamping device 16 is deployed to anchor the tool 10 in place. At the target location a material remover 18, such as a mill or a hone for example, of the tool 10 will be at longitudinal register with a feature (wireline seating nipple, no-go or seal bore, for example) in the tubular that is to have material removed. In an embodiment, the material remover 18 will have a longitudinal dimension greater than a longitudinal dimension of the feature from which material is to be removed. Accordingly, no movement axially is needed from tool 10 but rather it will stay anchored by the clamping device 16 and allow rotary movements discussed below to effect the goals of the tool 10. Removal of material is effected by rotation of the material remover 18 about its own axis pursuant to an electrically energized motor 20 in conjunction with rotation of a portion 22 of the tool 10 that is downhole of the clamping device 16. The rotation of portion 22 is about its own axis. The material remover 18 is also laterally displaceable along with motor 20. The combination of movements causes the material remover 18 to not only spin about its own axis but to move through space in a circle about the axis of the tool 10. The circle can be adjusted in diameter to suit a particular need and so that a precise depth of cut in a radial direction from the tool 10 is achievable. More specifically, because of the precise control of where the axis of the material remover 18 is relative to the axis of the tool 10, the exact cutting depth as measured from an innermost surface of a feature from which material is to be removed to an end of removal can be controlled. Enablement for the configurations and movements noted and the controls necessary to provide for these movements is found in a commercially available tool from Baker Hughes Incorporated known as a mechanical pipe cutter (MPC™) tool, further disclosed in U.S. Pat. No. 9,410,389, which is incorporated herein by reference in its entirety.

The precise depth of cut allows any amount of material desired to be removed from the feature and importantly allows the material removal to comprise an ultimate diameter greater than a restriction existing uphole of the target feature. While the tool 10 may be used anywhere in a borehole system, the particular utility in removal of material in areas of a borehole system downstream of a restriction that has a smaller diameter than the diameter that will result from operation of the tool 10 provides significant benefit over any tool of the prior art.

More specifically, the tool 10 has a relatively small diameter when the material remover 18 is retracted so that it can fit through a smaller restriction to access some feature downhole of that restriction. Then the feature may be milled or honed out to a larger diameter than the restriction through which the tool 10 passed to access the feature because of the radial displacement of the material remover 18. In other words, the tool 10 may be run through a smaller restriction, for example a 6 inch diameter restriction and yet remove material downhole of the 6 inch restriction to a diameter of, for example, 7 inches. This is due to the ability to radially displace the axis of the material remover 18 from the axis of the tool 10.

Depth of cut control gives a large degree of precision in what modification is desired for material removal. Specifically, it may be that a small amount of material is required to be removed so that another tool may pass the restriction or it may be that significantly more material is required to be removed for the next purpose of the operator. For example, a feature in a tubular such as perhaps a seat used in a previous operation and no longer required may need to be removed in its entirety in a particular iteration. The tool 10 allows careful and precise removal of material in a radial direction controlled by the radial displacement of the material remover 18. The rotation of the portion 22 of tool 10 moves the material remover 18 about its circle at that radial displacement dimension or can move the material remover 18 incrementally radially at each completion of a circular movement to slowly and precisely remove material. Removal can continue until, in an iteration, the tubing diameter is matched so that the end result would be as if the feature were never there or the amount of removal can be more or less removal. It is possible to remove material to a diameter larger than the tubing diameter providing there is enough material thickness of the tubular to accommodate the resulting undercut.

In another embodiment, the feature is a seal bore that requires polishing due to previous damage or wear. This can be accomplished by employing as the material remover 18 a hone, which will polish the seal bore to restore its sealing capacity. In other respects the tool 10 will be the same and include the same controls.

Referring to FIGS. 2-7 a method of using the tool 10 and method for removing material is illustrated. In FIG. 2, a tubular 30 is illustrated with a restriction 32 through which the tool 10 must pass and a target feature 34 from which material will be removed. The tool 10 is run into the tubular on electric wireline 36 past the restriction 32 until it is properly located with the material remover 18 in register with the target feature 34 (see FIG. 3), "register" being used to indicate that the entire length of feature 34 will be milled or honed without axial movement of the tool 10. This is achieved due to the length of the mill or hone being longer than the feature 34 such that an uphole end of the mill or hone is more uphole than the feature 34 and a downhole end of the mill or hone is more downhole of the feature 34 simultaneously. Once in this position, and referring to FIG. 4, the clamping device 16 is deployed to anchor the tool 10 to the tubular 30. Referring to FIG. 5, the tool 10 is actuated (electrically by wireline 36) to radially displace material remover 18 to the prescribed distance while rotating the same on its own axis and rotating the portion 22 of tool 10 about its own axis. This is continued until the desired amount of material is removed by material remover 18. Referring to FIG. 6, it can be seen that the feature 34 has been removed, the material remover 18 retracted into the tool 10, and the clamping device 16 has been disengaged. Referring to FIG. 7, the tool 10 is withdrawn from the tubular 30 past the restriction 32 and removed from the borehole system.

Set forth below are some embodiments of the foregoing disclosure:

Embodiment 1

An electromechanical rotary pipe mill or hone including a body, a motor with a mill or hone disposed thereon in radially adjustable position with respect to the body, a clamping device extendable from the body and configured for anchoring the tool in a tubular, and a portion of the body that is rotatable about an axis of the electromechanical pipe mill or hone.

Embodiment 2

The electromechanical rotary pipe mill or hone as in any prior embodiment wherein the mill or hone is of a longitudinal dimension greater than a target feature from which material is to be removed.

Embodiment 3

The electromechanical rotary pipe mill or hone as in any prior embodiment wherein the portion is rotatable about the axis of the electromechanical pipe mill or hone while the mill or hone is rotatable about its own axis.

Embodiment 4

The electromechanical rotary pipe mill or hone as in any prior embodiment wherein the mill or hone proceeds in a circle about the axis of the electromechanical pipe mill or hone.

Embodiment 5

A method for removing material in a tubular including running on electric wireline an electromechanical rotary pipe mill or hone as in any prior embodiment to a target location in a tubular, registering the mill or hone with a feature identified for removal of material, deploying the clamping device, rotating the mill or hone on its own axis, rotating a portion of the body about its own axis, and radially displacing the mill or hone to remove material.

Embodiment 6

The method as in any prior embodiment wherein the registering includes ensuring the mill or hone extends beyond an uphole and downhole end of the feature.

Embodiment 7

The method as in any prior embodiment wherein the rotating the mill or hone is by electric motor.

Embodiment 8

The method as in any prior embodiment wherein the running includes through a restriction having a diameter smaller than a planned dimension of the feature after removing material.

Embodiment 9

The method as in any prior embodiment wherein the feature is a restriction.

Embodiment 10

The method as in any prior embodiment wherein the feature is a seal bore.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method for removing a feature on an interior wall of a tubular, the feature protruding into interior of tubular and having a first axial length, the method comprising:
    running a rotary tool on electric wireline to a target location in the tubular near the feature to be removed, the tool being an electromechanical rotary pipe mill or hone tool having a body; the body having a motor with a mill or hone disposed thereon in radially adjustable position with respect to the body, the mill or hone having a second axial length greater than the first axial length of the feature, wherein the motor rotates the mill or hone about the mill or hone's own axis; a clamping device extendable from the body and configured for anchoring the tool in the tubular; wherein a portion of the body includes the rotatable mill or hone and the portion is rotatable about an axis of the electromechanical pipe mill or hone tool;
    registering the mill or hone with the feature identified for removal;
    deploying the clamping device;
    rotating the mill or hone on its own axis;
    rotating the rotatable portion of the body about its own axis; and
    radially displacing the rotating mill or hone to remove the feature without axial movement of tool and without milling or honing completely through the wall of the tubular.

2. The method as claimed in claim 1 wherein the registering includes ensuring the mill or hone extends beyond an uphole and downhole end of the feature.

3. The method as claimed in claim 1 wherein the rotating of the mill or hone removes material until the feature is removed so that adjacent tubular diameter is matched.

4. The method as claimed in claim 1 wherein the running includes running the electric wireline through a restriction having a diameter smaller than a planned dimension of the feature after removing the feature.

5. The method as claimed in claim 1 wherein the feature is a restriction.

6. The method as claimed in claim 1 wherein the feature is a seal bore.

7. The method as claimed in claim 6 wherein the removing of the feature is polishing the seal bore to restore a sealing capacity thereof.

8. The method as claimed in claim 1 wherein the removing of a feature includes undercutting the tubular within the thickness of the tubular.

* * * * *